Patented Dec. 20, 1932

1,891,684

UNITED STATES PATENT OFFICE

PAUL NAWIASKY, OF LUDWIGSHAFEN-ON-THE-RHINE, ERNST HONOLD, OF FRANKFORT-ON-THE-MAIN-FECHENHEIM, AND HUGO WOLFF, OF MANNHEIM, GERMANY, ASSIGNORS TO GENERAL ANILINE WORKS, INC., OF NEW YORK, N. Y., A CORPORATION OF DELAWARE

VAT DYESTUFFS OF THE DIPHTHALOYLCARBAZOLE SERIES

No Drawing. Application filed October 17, 1930, Serial No. 489,478, and in Germany October 24, 1929.

The present invention relates to new vat dyestuffs derived from diphthaloylcarbazole and process of producing the same.

We have found that new and valuable vat dyestuffs having good properties of fastness are obtained by condensing α-amino derivatives of the diphthaloylcarbazoles derived from 1.1'-dianthrimides having the general formula:

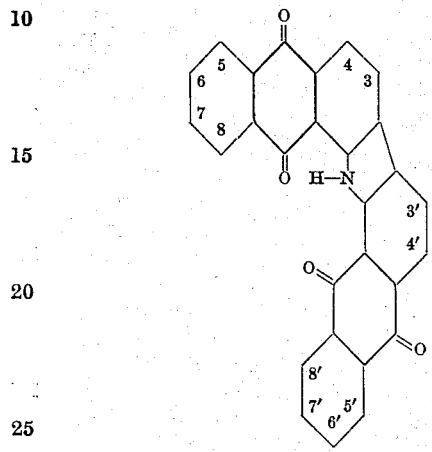

with benzanthrones substituted by halogen in one of the peri positions, viz. the 2- and Bzl-positions, which may be further substituted. The condensation is preferably carried out in indifferent organic solvents, such as for example nitrobenzene, naphthalene and nitronaphthalene, in the presence of condensing catalysts, for example copper and its compounds, and acid-binding agents. The resulting dyestuffs are probably imides of the general formula:

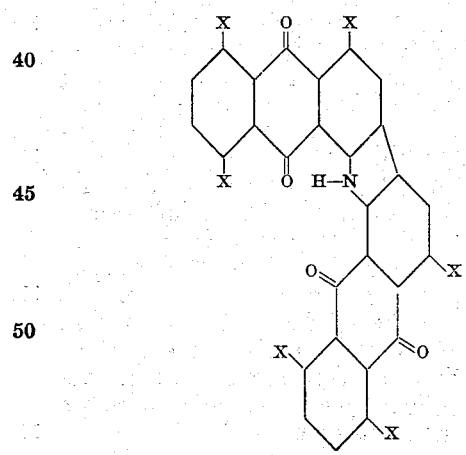

in which at least one of the positions marked X is connected by means of an imino group to one of the peri positions of a benzanthrone.

These dyestuffs may be further condensed by means of acid or alkaline condensing agents into vat dyestuffs dyeing deep red brown to brown shades probably corresponding to the general formula:

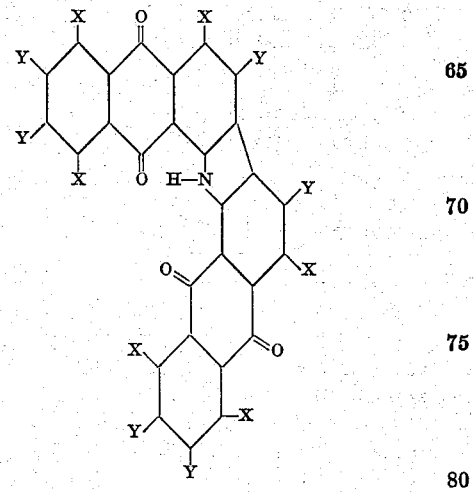

in which at least one of the positions marked X is connected by means of an imino group to one of the peri positions of a benzanthrone, the other peri position of the said benzanthrone being connected to a position marked Y vicinal to the substituted X-position. As condensing agents of the said kind may be mentioned for example alcoholic potash, fused potash, sulphuric acid and aluminium chloride.

The following examples will further illustrate the nature of this invention, but the invention is not restricted to these examples. The parts are by weight.

Example 1

In order to prepare the condensation product from 4.4'-diaminodiphthaloylcarbazole the following procedure is adopted: 9.4 parts of 4.4'-diaminodiphthaloylcarbazole are heated to boiling under a reflux condenser with 12 parts of Bzl-brombenzanthrone, 10 parts of anhydrous sodium acetate, 200 parts of nitrobenzene, 1 part of copper oxide and 0.2 part of copper acetate until the reaction is practically completed, which is the case after about 20 hours. The reaction mixture is allowed to cool to about 50° C., the reaction product filtered off by suction, washed with benzene, alcohol and water, and dried. In order to free the dark-colored crude product from excess of brombenzanthrone it may be treated with inert organic solvents in which the new compound is difficultly soluble even while hot. The new compound dissolves in concentrated sulphuric acid giving a dark yellow brown coloration. By adding dilute sulphuric acid to the solution the coloration becomes green and the new compound may be precipitated in the form of a red brown flocculent precipitate by pouring into water. It dyes cotton brownish gray shades from a warm hydrosulphite vat.

The condensation product from 5.5'-diaminodiphthaloylcarbazole, which in its appearance and behaviour is very similar to the condensation product obtained from 4.4'-diaminodiphthaloylcarbazole, is obtained in an analogous manner.

Example 2

7.5 parts of the condensation product obtained according to Example 1 from 4.4'-diaminodiphthaloylcarbazole are introduced at about 170° C. into an alcoholic potash melt consisting of 37.5 parts of potassium hydroxide and 20 parts of ethyl alcohol. The reaction mixture is stirred at from 175° to 180° C. until the formation of dyestuff is completed. The whole is then diluted with water and the dyestuff is worked up in the usual manner. It may be completely vatted and dyes powerful reddish dark brown shades from a warm red brown hydrosulphite vat. The dyestuff dissolves in concentrated sulphuric acid giving a reddish brown coloration and may be separated, for example by fractional precipitation from sulphuric acid, into two fractions which give more yellowish brown dyeings and more reddish brown dyeings.

Example 3

3 parts of the condensation product obtained from 5.5'-diaminodiphthaloylcarbazole and Bzl-brombenzanthrone are introduced at 210° C. into 15 parts of fused potassium hydroxide and the reaction mixture is stirred at the same temperature until no further increase in the formation of dyestuff can be detected. The whole is then diluted with water and the resulting dyestuff is freed from non-dyeing constituents, preferably by vatting. The new product dissolves in concentrated sulphuric acid giving a dark olive green coloration and dyes cotton powerful coffee brown shades from a warm hydrosulphite vat.

Example 4

5 parts of the condensation product from 5.5'-diaminodiphthaloylcarbazole and Bzl-brombenzanthrone are introduced at 100° C. into a mixture of 50 parts of pyridine and 10 parts of aluminium chloride and the whole is stirred for about 2 hours at about 120° C. The whole is then poured into water and the resulting dyestuff is freed by vatting from non-vattable constituents. The new dyestuff dissolves in concentrated sulphuric acid giving a yellow brown coloration and dyes cotton powerful red brown shades from a warm red brown colored hydrosulphite vat.

Example 5

9.4 parts of 4.5'-diaminodiphthaloylcarbazole are heated to boiling with 12 parts of Bzl-brombenzanthrone, 10 parts of anhydrous sodium acetate, 1 part of copper oxide and 0.2 part of copper acetate in 200 parts of nitrobenzene until condensation is practically complete which is the case in about 20 hours. The reaction mixture is allowed to cool to 50° C., whereupon the precipitate is filtered off, washed with benzene, alcohol and water, and dried. Any excess of brombenzanthrone in the product may be extracted with indifferent organic solvents in which the new compound is difficultly soluble even in the warm. It dissolves in concentrated sulphuric acid to give a brown olive coloration which turns green on addition of water, it dyes cotton from a yellow brown vat currant shades.

7.5 parts of the said condensation product are introduced at about 170° C. into a melt of alcoholic caustic potash consisting of 37.5 parts of potassium hydroxide and 20 parts of ethyl alcohol. The reaction mixture is stirred at 175° to 180° C. until the condensation is complete, whereupon it is diluted with water and worked up in the usual manner. The dyestuff freed from products not capable of being vatted is a dark brown powder dissolving in concentrated sulphuric acid giving a dark yellow brown solution, and dyeing cotton from a yellow brown vat strong coffee brown shades.

Example 6

10 parts of 5.5'-diaminodiphthaloylcarbazole are heated to boiling for 24 hours with 11 parts of 2-chlorbenzanthrone, 10 parts of anhydrous sodium acetate, 1 part of copper oxide, 0.2 part of anhydrous copper acetate and 300 parts of nitrobenzene. After cooling, the reaction mixture is filtered by suction and the residue washed with nitrobenzene, hot ethyl alcohol and water. The resulting condensation product is a dark brown powder which dissolves in concentrated sulphuric acid giving a brown violet coloration which changes to green when warmed. When the sulphuric acid solution is poured into water, the new compound is precipitated as a red brown flocculent precipitate. It dyes the vegetable fibre red brown shades from a warm hydrosulphite vat.

If 1 molecular proportion of the 2-chlorbenzanthrone be allowed to act on 5.5′-diaminodiphthaloylcarbazole instead of 2 molecular proportions, a condensation product which is very similar in its chemical and tinctorial properties to that obtained according to the first paragraph of this example is obtained.

In an analogous manner condensation products which are very similar in their properties to the condensation product from 5.5′-diaminodiphthaloylcarbazole are obtained from 4.4′- and 4.5′-diaminodiphthaloylcarbazole and 5-amino-4-benzoylaminodiphthaloylcarbazole with 2-halogenbenzanthrones.

*Example 7*

10 parts of the condensation product from 1 molecular proportion of 5.5′-diaminodiphthaloylcarbazole and 2 molecular proportions of 2-chlorbenzanthrone obtainable according to Example 6 are slowly introduced while stirring at 160° C. into a melt of 40 parts of caustic potash and from 20 to 25 parts of ethyl alcohol, and the reaction mixture is heated at from 170° to 175° C. until the formation of dyestuff is completed. After cooling, the melt is boiled up with water and the dyestuff which separates out is worked up in the usual manner. A dark brown paste is obtained which dyes the vegetable fibre violet brown shades from a brown red vat. When dried, the dyestuff is a dark brown powder which dissolves in concentrated sulphuric acid giving a brown coloration.

*Example 8*

10 parts of the condensation product obtainable from 1 molecular proportion of 2.7-dichlorbenzanthrone and 2 molecular proportions of 5-amino-4′-benzoylaminodiphthaloylcarbazole in a manner similar to that described in Example 6 are heated to from 50° to 52° C. with 200 parts of concentrated sulphuric acid until the original wine red color of the solution has changed to violet brown, which is the case after about 5 hours. After cooling, the reaction mixture is poured into water and the product is filtered off and washed until neutral. The dyestuff is thus obtained as a brown black paste which dyes the vegetable fibre from a red brown vat beautiful fast red brown shades. When dried, the dyestuff is a brown black powder which dissolves in concentrated sulphuric acid giving a violet brown coloration.

Similar dyestuffs are obtained by treating the condensation products from 1 molecular proportion of 2.6-dichlorbenzanthrone or 2-chlorbenzanthrone and 1 or 2 molecular proportions of 5-amino-4′-benzoylaminodiphthaloylcarbazole with concentrated sulphuric acid.

When the said condensation products are heated with sulphuric acid at temperatures higher than those specified, as for example at 100° C., a saponification of the benzoylamino group takes place and dyestuffs are obtained which dye more violet shades than the compounds which still contain the benzoyl group.

*Example 9*

10 parts of 5.5′-diaminodiphthaloylcarbazole are heated to boiling with 7 parts of Bzl-nitro-2-chlorbenzanthrone, 6 parts of calcined soda, 0.5 part of copper oxide and 300 parts of nitrobenzene until the condensation is completed. After cooling, the reaction mixture is filtered by suction and the residue is washed with nitrobenzene, hot alcohol and water. The resulting dyestuff is a dark brown powder, which when dissolved in concentrated sulphuric acid and reprecipitated is a dark brown paste, which dyes the vegetable fibre red brown shades from a yellow brown vat. The dyestuff dissolves in concentrated sulphuric acid giving a violet gray coloration.

*Example 10*

10 parts of the condensation product obtainable from 1 molecular proportion of 4.5′-diaminodiphthaloylcarbazole and 2 molecular proportions of 2-chlorbenzanthrone in a manner similar to that described in Example 6 are fused at from 125° to 130° C. after mixing with 90 parts of ground aluminium chloride and 30 parts of anhydrous sodium chloride until unchanged initial material can no longer be detected. After cooling, the melt is decomposed with water, boiled, filtered and the residue washed until neutral. The resulting dyestuff is a dark brown paste which dyes the vegetable fibre Bordeaux red shades from a brown vat. When dried, the dyestuff is a black brown powder which dissolves in concentrated sulphuric acid giving a turbid green coloration.

What we claim is:

1. As new articles of manufacture vat dyestuffs derived from diphthaloylcarbazole corresponding to the general formula:

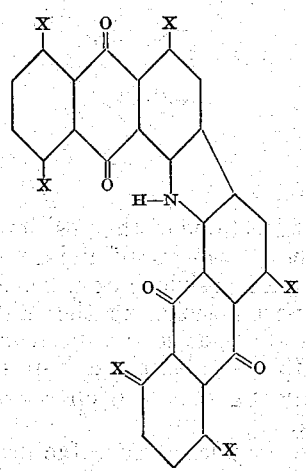

in which at least one of the positions marked X is connected by means of an imino group to one of the peri positions of a benzanthrone.

2. As new articles of manufacture vat dyestuffs derived from diphthaloylcarbazole corresponding to the general formula:

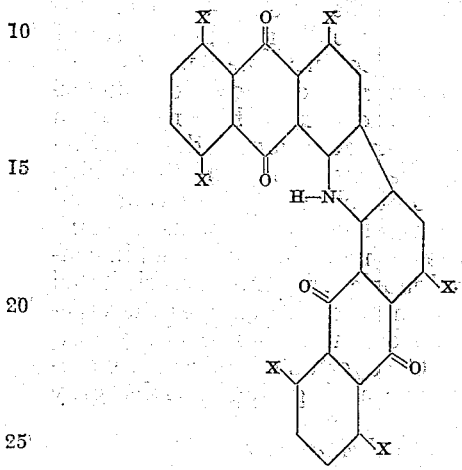

in which at least one of the positions marked X is connected by means of an imino group to the Bzl-position of a benzanthrone.

3. As new articles of manufacture vat dyestuffs derived from diphthaloylcarbazole corresponding to the general formula:

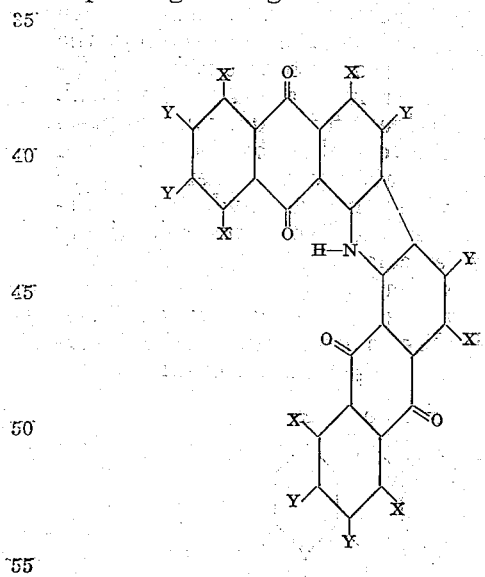

in which at least one of the positions marked X is connected by means of an imino group to one of the peri positions of a benzanthrone, the other peri position of the said benzanthrone being connected to a position marked Y vicinal to the substituted X-position, the dyestuffs dyeing cotton deep red brown to brown shades.

4. As new articles of manufacture vat dyestuffs derived from diphthaloylcarbazole corresponding to the general formula:

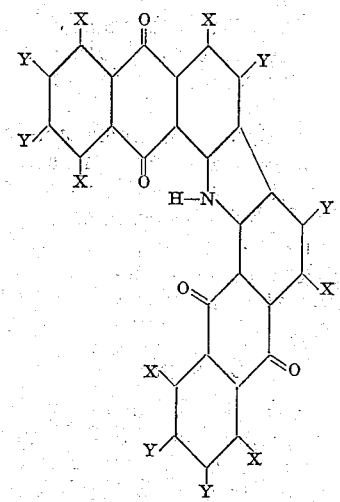

in which at least one of the positions marked X is connected by means of an imino group to the Bzl-position of a benzanthrone, the 2-position of the said benzanthrone being connected to a position marked Y vicinal to the substituted X-position, the dyestuff dyeing cotton deep red brown to brown shades.

5. As a new article of manufacture the vat dyestuff derived from diphthaloylcarbazole probably corresponding to the formula:

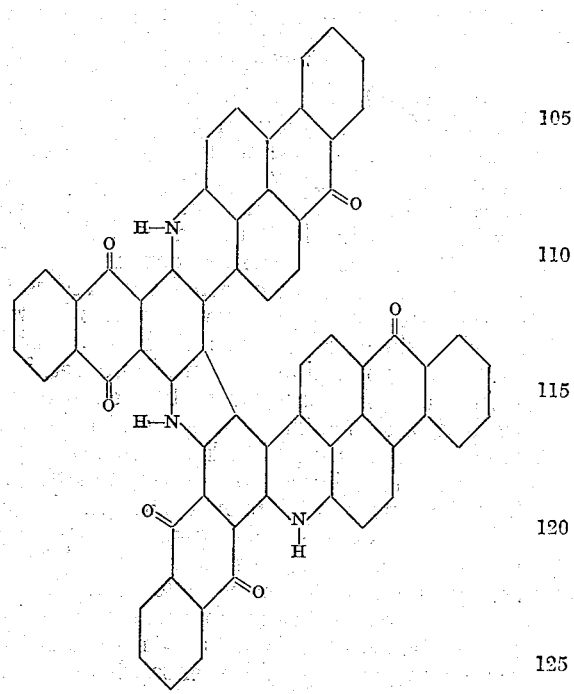

dyeing cotton from a red brown vat strong dark reddish brown shades.

6. As a new article of manufacture the vat dyestuff derived from diphthaloylcarbazole probably corresponding to the formula:
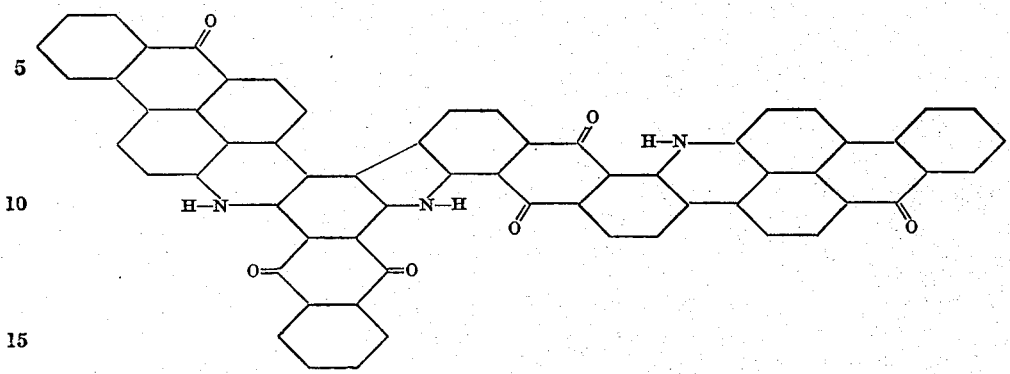
dissolving in concentrated sulphuric acid to give a dark yellow brown solution and dyeing cotton from a yellow brown vat strong coffee brown shades.
In testimony whereof we have hereunto set our hands.
PAUL NAWIASKY.
ERNST HONOLD.
HUGO WOLFF.